US008940814B2

United States Patent
Karpov et al.

(10) Patent No.: US 8,940,814 B2
(45) Date of Patent: Jan. 27, 2015

(54) DISPERSIONS COMPRISING FUNCTIONALIZED OXIDIC NANOPARTICLES

(75) Inventors: Andrey Karpov, Mannheim (DE); Hartmut Hibst, Schriesheim (DE); Berend Eling, Lemfoerde (DE); Joern Duwenhorst, Lemoerde (DE); Richard Riggs, Mannheim (DE); Alexander Traut, Schriesheim (DE); Christof Kujat, Neustadt (DE); Cornelia Roeger, Schwetzingen (DE); Christian Krausche, Ruedlingen (CH)

(73) Assignee: BASF SE (DE)

( * ) Notice: Subject to any disclaimer, the term of this patent is extended or adjusted under 35 U.S.C. 154(b) by 557 days.

(21) Appl. No.: 13/139,437

(22) PCT Filed: Dec. 9, 2009

(86) PCT No.: PCT/EP2009/066690
§ 371 (c)(1),
(2), (4) Date: Jun. 13, 2011

(87) PCT Pub. No.: WO2010/066768
PCT Pub. Date: Jun. 17, 2010

(65) Prior Publication Data
US 2011/0245391 A1  Oct. 6, 2011

(30) Foreign Application Priority Data
Dec. 12, 2008 (EP) ..................................... 08171438

(51) Int. Cl.
C08K 9/00 (2006.01)
C08K 9/10 (2006.01)
C08K 3/22 (2006.01)

(52) U.S. Cl.
CPC .... C08K 9/10 (2013.01); C08K 3/22 (2013.01)
USPC ........................ 523/200; 524/262; 252/589

(58) Field of Classification Search
USPC ............ 523/200; 524/262; 252/589; 106/270
See application file for complete search history.

(56) References Cited

U.S. PATENT DOCUMENTS

| 2,885,366 | A | 5/1959 | Iler |
| 4,447,270 | A | 5/1984 | Howard et al. |
| 4,923,518 | A | 5/1990 | Brand et al. |
| 5,914,101 | A * | 6/1999 | Tapley et al. .................. 424/59 |
| 2004/0099975 | A1 | 5/2004 | Wu et al. |
| 2006/0134339 | A1 | 6/2006 | Wang et al. |
| 2006/0229406 | A1 * | 10/2006 | Silverman et al. ............ 524/501 |
| 2008/0248289 | A1 * | 10/2008 | Jonschker et al. ............ 428/328 |
| 2011/0152433 | A1 | 6/2011 | Bechtloff et al. |
| 2011/0163278 | A1 * | 7/2011 | Domke et al. ............. 252/519.3 |
| 2011/0245392 | A1 | 10/2011 | Karpov et al. |

FOREIGN PATENT DOCUMENTS

| DE | 1592951 A1 | 2/1971 |
| DE | 102005056622 | 5/2007 |
| DE | 102006035136 A1 | 1/2008 |
| EP | 449888 A1 | 10/1991 |
| GB | 1179171 | 1/1970 |
| WO | WO-03104319 A1 | 12/2003 |
| WO | WO-2006/083817 A1 | 8/2006 |
| WO | WO-2006/099918 A2 | 9/2006 |
| WO | WO-2006/102669 A1 | 9/2006 |
| WO | WO-2006/124670 A2 | 11/2006 |
| WO | WO-2007/059841 | 5/2007 |
| WO | WO-2007/075654 A2 | 7/2007 |
| WO | WO-2007134712 A1 | 11/2007 |
| WO | WO-2008/015056 | 2/2008 |

OTHER PUBLICATIONS

International Preliminary Report on Patentability for International Application PCT/EP2009/066690, dated Mar. 22, 2011.
International Search Report for PCT/EP2009/066690, mailed Jun. 1, 2010.
Srinivasan, et al., "Influence of Al dopant on microstructure and optical properties of ZnO thin films prepared by sol-gel spin coating method", Optical Materials, (2007), vol. 30, Issue 2, pp. 314-317.
Wang, et al., "Effect of Polyelectrolyte Dispersants on the Preparation of Silica-Coated Zinc Oxide Particles in Aqueous Media", Journal of the American Ceramic Society, vol. 85, No. 8, (2002), pp. 1937-1940.

* cited by examiner

*Primary Examiner* — Hannah Pak
(74) *Attorney, Agent, or Firm* — Drinker Biddle & Reath LLP

(57) ABSTRACT

Dispersion comprising functionalized metal oxide particles, polymerizable compounds and if appropriate a solvent and their use for stabilizing polymers.

17 Claims, No Drawings

DISPERSIONS COMPRISING FUNCTIONALIZED OXIDIC NANOPARTICLES

CROSS-REFERENCE TO RELATED APPLICATIONS

This application is a national stage application (under 35 U.S.C. §371) of PCT/EP2009/066690, filed Dec. 9, 2009, which claims benefit of EP 08171438.8, filed Dec. 12, 2008.

BACKGROUND OF THE INVENTION

The present invention relates to dispersions with functionalized metal oxide particles, to their use and to a method for their production.

It is known to incorporate inorganic compounds, in particular inorganic oxides, into organic polymers in order to improve their properties, for example their UV stability.

From US 2004/0099975 A1 it is known to modify the surface of types of inorganic oxides which are present as nanoparticles with an alkoxysilane.

From US 2006/0134339 A1 it is known to functionalize colloidal metal oxides with a silane, for example an aminosilane, and to add a water-dispersible polymer to the resulting aqueous dispersion. Compositions of this type are reportedly used as corrosion inhibitor.

WO 2006/083817 A1 discloses photostable copolyether esters with nanoparticulate titanium dioxide, cerium oxide or zinc oxide, where the titanium oxide can be treated with a silane.

WO 2006/099918 A2 discloses aqueous preparations for coating substrate surfaces which comprise polyurethane compounds present in dispersed form and dispersed mineral particles, where the mineral particles can consist of zinc oxide and the zinc oxide may be hydrophobicized.

WO 2006/102669 A1 discloses a method for dispersing particles in polymers, where the particles may be, for example, titanium dioxide and zinc oxide, and where the particles may be functionalized.

WO 2006/124670 A2 discloses coated metal oxide nanoparticles with phosphonic acid ligands on the metal oxide surface.

From WO 2007/075654 A2 it is known to improve the stability of polymers by using zinc oxide nanoparticles, where the zinc oxide nanoparticles can be modified on their surface in order to reduce their aggregation.

A disadvantage of the known measures for improving the photo- and UV-stability of polymers through the use of inorganic oxides, for example zinc oxides, is that the inorganic oxides used can attack the surrounding polymer matrix as a result of the photocatalytic effect and in so doing adversely affect color, transparency and mechanical properties of the polymer matrix.

It is generally known that amorphous coatings, such as, for example, an $SiO_2$-containing coating, can suppress the photocatalytic effect on the UV-absorbing particles [Journal of the American Ceramic Society, 2002, 85 [8], pp. 1937-1940].

Methods for depositing an amorphous coating, for example an $SiO_2$ coating, onto UV-absorbing particles are also known. According to WO 03/104319 A1, ZnO is coated with an $SiO_2$ layer through deposition of products of the hydrolysis of tetraethoxysilane. The ZnO coated with $SiO_2$ has a lower photocatalytic activity.

WO 2007/059841 discloses zinc oxide nanoparticles with an average particle size in the range from 3 to 50 nm, the particle surface of which has been modified with silica, dispersed in an organic solvent. These are obtainable by a method in which, in a step a), one or more precursors for the nanoparticles are reacted in an alcohol to give the nanoparticles, in a step b), the growth of the nanoparticles is ended by adding at least one modifier, the precursor for silica, if, in the UV/VIS spectrum of the reaction solution, the absorption edge has reached the desired value and if appropriate in step c) the alcohol from step a) is removed and replaced by another organic solvent. The term "silica" here refers to materials which consist essentially of silicon dioxide or silicon hydroxide. In one variant, in a further step, a surface modifying agent can be added; this may be an organofunctional silane.

A disadvantage of this method is that very small ZnO particles having an average particle size preferably of from 7 to 15 nm are formed and as a result very large amounts of silanes are consumed. These large amounts of silanes are incorporated into the polymer matrix and may lead to a deterioration in, for example, the mechanical properties. A further disadvantage of the very small ZnO particles produced according to WO 2007/059841 is a reduced UV-protecting range.

WO 2007/134712 discloses a production method for producing nanoparticles (inter alia of Zn oxide, Ti oxide or Ce oxide) having an average particle size in the range from 3 to 50 nm. Here, precursors to nanoparticles are reacted with a silane precursor to give the nanoparticles. A disadvantage of this method is that very large amounts of silanes are consumed. A further disadvantage of the method is that very small ZnO particles are formed. This represents a disadvantage with regard to the UV-protecting properties.

There is a need for improved inorganic UV-absorbing particles which can be distributed in polymers in an agglomerate-free manner without adversely affecting such polymer properties as, for example, transparency in the process. In this connection, it is important to minimize the fraction of functionalizing groups so that these have the lowest possible influence on the polymer properties.

BRIEF SUMMARY OF THE INVENTION

It was therefore an object of the present invention to provide improved dispersions for stabilizing polymers.

The invention relates to a dispersion comprising
1) functionalized UV-absorbing inorganic particles FM which have an average particle size, measured by the dynamic light scattering (DLS) method, in the nano range, preferably in the range from 10 nm to 80 nm, in particular 10 nm to 50 nm, and
2) polymerizable compounds PP, in particular monomers, oligomers or prepolymers which can be converted into polymers by preferably non-radical polymerization, and also if appropriate a solvent S, and/or
3) a polymer soluble in the solvent S,
wherein the particles FM have an amorphous coating.

DETAILED DESCRIPTION OF THE INVENTION

The particles FM are nanoparticles of metal oxides, other metal compounds, metals or of nonmetals. In one preferred embodiment, the functionalized UV-absorbing particle FM is a metal oxide particle, in particular a zinc oxide, titanium oxide or cerium oxide or a mixture thereof, especially a zinc oxide.

The term "metal oxide particles" refers to particles which consist essentially of metal oxide, where these particles, depending on the particular surrounding conditions, can also have a certain hydroxide concentration on their surface, as is known to the person skilled in the art from the prior art. In one embodiment, the ZnO particles are therefore, for example, ZnO/zinc hydroxide/zinc oxide hydrate particles, the $TiO_2$ particles are $TiO_2$/titanium hydroxide/titanium oxide hydrate particles, the $CeO_{2-x}$ particles ($0 \leq x \leq 0.5$) are $CeO_{2-x}$/cerium hydroxide/cerium oxide hydrate particles. Moreover, depending, for example, on the nature of the metal precursor used, fragments and/or products of the metal precursor can be found on the metal oxide surface, for example acetate groups in the case of the use of $Zn(OAc)_2$ or $Zn(OAc)_2$ dihydrate for producing zinc oxide.

Moreover, the metal oxide particles FM can be doped with foreign atoms, for example with metal atoms, in particular with $Fe^{2+}$, $Fe^{3+}$, $Co^{2+}$, $Co^{3+}$, $Cu^{2+}$, $Al^{3+}$, $In^{3+}$, $Ga^{3+}$, $Ni^{2+}$, $Mg^{2+}$, $V^{5+}$, $Cr^{3+}$, $Mn^{2+}$, $Mn^{4+}$, $Nb^{5+}$, $Mo^{5+}$, $Ta^{5+}$, $La^{3+}$, $Y^{3+}$, preferably in an amount of from 10 to 20 000 ppm, particularly preferably from 100 to 10 000 ppm, based on the main metals (Zn, Ti, Ce or their both mechanical mixtures and also chemical mixed oxides). The doping can take place in a manner known per se, e.g. according to the method known from DE 10 2006 035 136 A1, of atomizing corresponding metal compounds to form an aerosol, reaction at suitable temperatures with oxygen and work-up or according to [Optical Materials, 2007, 30, pp. 314-317] by a coprecipitation and a subsequent thermal treatment of solutions comprising metal oxide precursors and doping metal precursors.

Functionalization is preferably understood as meaning that the surface of the particles FM has been modified through the addition reaction of or through reaction with compounds which have an affinity to the particular surface, where the particles FM, in particular the metal oxide particles, interact with a functionalizing compound F. Depending on the type of functionalizing compound and the other conditions, such as, for example, the chemical nature and the surface structure of the particles FM, this can take place in the form of an absorption, coordinative bonding or chemical bonding.

In one preferred embodiment, the metal oxide particles FM are functionalized with a compound F of the formula I $$R^1LF^1$$

in which
$R^1$ is an oxygen-containing radical, in particular alkoxy; aryloxy; ether-group-containing oligomer or polymer
L is a divalent bonding group, in particular alkylene having preferably 1 to 10 carbon atoms, in particular methylene, ethylene or propylene
$F^1$ is a metal-oxide-affine group, preferably silanes, amines, carboxylic acids, carboxylates, phosphonic acid, phosphonates, phosphoric acid, phosphates, sulfonic acid or sulfonates, in particular $NH_2$, NH, COOH, $[COO]^-$, $PO_3H_2$, $[PO_3H]^-$, $[PO_3]^{2-}$, $[PO_4H]^{2-}$, $[PO_4H_2]^-$, $[SO_3]^-$, $CO—CH_2—CO$, especially a trialkoxysilane radical of the formula $—Si(OR)_3$, in which R is an alkyl radical.

In one particularly preferred embodiment, the functionalizing compound F corresponds to the following formula II:

$$R^{23}O—(CH_2CR^{21}R^{22}O)_p(CH_2)_q—F^1$$

in which
$R^{21}$, $R^{22}$ are identical or different, hydrogen or an alkyl radical, in particular having 1 to 4 carbon atoms, preferably hydrogen, methyl or ethyl, where $R^{21}$ and $R^{22}$, if they appear more than once, can have different meanings and the group indexed with p can occur blockwise or in random distribution
$R^{23}$ is hydrogen, an alkyl radical, in particular having 1 to 4 carbon atoms, in particular methyl or ethyl, an alkaryl radical, in particular benzyl, an aryl radical, in particular phenyl, an alkoyl radical, in particular acetyl, or an aroyl radical, in particular benzoyl
p is 0 or an integer from 1 to 100, in particular 0 or 1 to 50, preferably 0 or 1 to 30
q is 0 or an integer from 1 to 10, in particular 0 or an integer from 1 to 3,
and in which $F^1$ has the meaning stated in formula I.

In one very particularly preferred embodiment, the metal oxide is a zinc oxide, titanium oxide or cerium oxide or a mixture thereof and F corresponds to the following formula III:

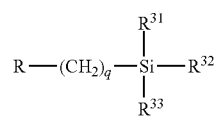

in which
R is $R^{10}O(CH_2CHR^{11}O)_p$
p is 0 or an integer, in particular 1 to 100, preferably 1 to 30, where the group indexed with p can be composed of radicals with different meanings for $R^{11}$
$R^{10}$ is H or $C_1$-$C_4$-alkyl, in particular methyl or ethyl
$R^{11}$ is H, alkyl having 1 to 4 carbon atoms, in particular hydrogen, methyl or ethyl
$R^{31}$, $R^{32}$, $R^{33}$ are identical or different, hydrogen or alkoxy, in particular $C_1$-$C_4$-alkyloxy, in particular methoxy or ethyloxy; acyloxy, in particular acetoxy; amino; halogen, in particular Cl, where at least one of the groups $R^1$, $R^2$, $R^3$ is hydrolyzable and is in particular methoxy or ethoxy
q is an integer, in particular 1-10, preferably 1-3.

In one preferred embodiment:
q is 3 and/or
$R^{31}$, $R^{32}$ and $R^{33}$ are in each case alkoxy, in particular methoxy or ethoxy and/or
R is $CH_3—O—(CH_2CHR^{11})_p—$, where $R^{11}$ is H, $CH_3$ or $C_2H_5$ and p is an integer from 1 to 15,
with combinations of the preferred embodiments being possible.

Very particularly preferred compounds F are
$CH_3—O—(CH_2CH_2O)_{6-9}(CH_2)_3Si(OR)_3$, $CH_3O[CH_2CH(CH_3)O]_{10}(CH_2CH_2O)_5(CH_2)_3Si(OR)_3$, $CH_3O[CH_2CH(CH_2CH_3)O]_2[CH_2CH(CH_3)O]_5(CH_2)_3Si(O)_3$, in which R is methyl or ethyl.

The functionalization of the particles FM preferably takes place by contacting nonfunctionalized particles and/or a dispersion comprising nonfunctionalizing particles in a solvent with a functionalizing compound F or with mixtures of functionalizing compounds If appropriate in the presence of one or more catalysts. This can take place, for example, by initially introducing a suspension of metal oxide particles in a solvent and subsequently adding the functionalizing compound F dropwise, preferably with stirring at temperatures from crystallization points to boiling points of the solvents used, preferably from 5 to 100° C., in particular from room temperature to 80° C. Besides or instead of heating and/or stirring, further energy sources such as, for example, microwaves, ultrasound or grinding, can be used to increase the rate of the functionalization process. The functionalizing compound F can be added in pure form or as a solution or suspension. Usually, from 1 to 100% by weight, in particular from 5 to 50% by weight, of the functionalizing compound F, based on metal oxide particles, are added. If a catalyst is required for the functionalization, this may, for example, already be present in the initial charge besides the metal oxide particles, or can be added following the dropwise addition of the functionalizing compound. For the functionalization of metal oxide particles with silanes, preferably water, acids or bases are added as catalysts. These can be added to the reaction mixture before adding the functionalizing compound F or after adding the functionalizing compound F.

According to the present invention, it has surprisingly been found that the functionalized particles FM can be further coated with an amorphous layer. In one preferred embodiment, the functionalized particles FM are completely coated with an amorphous layer such that on the surface of the coated and functionalized particles FM, the surface, e.g. of ZnO, present before functionalization and coating, is no longer seen by conventional surface analysis methods, in particular by means of transmission electron microscopy (TEM). This also means that the functional groups bonded to the particle surface do not prevent the coating process. Within the context of the present invention, amorphous is understood as meaning that the molecules are irregular in the coating layer and not arranged in a crystal lattice.

The coating of functionalized metal oxide particles can take place, for example, through contacting with one or more precursors of the amorphous layer if appropriate in the presence of one or more catalysts. This can take place, for example, by initially introducing a suspension of functionalized metal oxide particles in a solvent and subsequently adding the precursor of the amorphous layer dropwise, preferably with stirring at temperatures from crystallization points to boiling points of the solvents used, preferably from 5 to 100° C., in particular from room temperature to 80° C. Besides or instead of heating and/or stirring, further energy sources such as, for example, microwaves, ultrasound or grinding, can be used to increase the rate of the functionalization process. The coating can be detected in particular with electron microscopic methods, in particular with transmission electron microscopy (TEM).

In one preferred embodiment, the amorphous coating comprises aluminum oxygen compounds, zirconium oxygen compounds or silicon oxygen compounds or a mixture thereof. Coating with an amorphous layer is preferably coating with oxides, oxide hydroxides or oxide hydrates of silicon, aluminum or zirconium. Such coatings are known per se, e.g. from U.S. Pat. No. 2,885,366, DE-A-159 29 51, U.S. Pat. No. 4,447,270 and EP-A-449 888 and are obtainable, for example, through deposition of hydrolyzable Si-, Al- or Zr-containing precursors. For example, silicates, aluminates or zirconates (e.g. sodium silicate, sodium aluminate or sodium zirconate) or their mixtures are used for this. Furthermore, it is possible to use acids, e.g. for the $SiO_2$-containing coating, silicic acids (e.g. orthosilicic acid $H_4SiO_4$, or its condensation products, e.g. disilicic acid $H_6Si_2O_7$ or polysilicic acids); for the $ZrO_2$-containing coating, e.g. metazirconium acid $H_2ZrO_3$ or orthozirconium acid $H_4ZrO_4$ or hydroxides (e.g. $Al(OH)_3$). Moreover, it is possible to use organometallic precursors of Si, Al and Zr or their mixtures, which produce $SiO_2$, $Al_2O_3$ or $ZrO_2$ or their hydrates or oxyhydroxides during hydrolysis. Such precursors are known to the person skilled in the art. To produce an $SiO_2$-containing layer, tetraalkoxysilanes $(Si(OR)_4$, e.g. tetramethoxysilane, tetraethoxysilane), for example, are used. To produce an $Al_2O_3$-containing layer, Al alcoholates (e.g. aluminum isopropylate, aluminum isobutylate), for example, are used. To produce a $ZrO_2$-containing layer, Zr alcoholates (e.g. zirconium isopropylate, zirconium n-butylate, zirconium isobutylate), for example, are used.

Particular preference is given to an amorphous $SiO_2$-containing layer. Particularly preferred precursors for coating with an amorphous $SiO_2$-containing layer are tetraethoxysilane, tetramethoxysilane or waterglass.

The precursors can be added in pure form or as a solution or suspension. Usually, the precursor is used in an amount corresponding to 2 to 25% by weight, preferably 4 to 15% by weight, of the amorphous layer, based on the particles FM. If a catalyst is required for the functionalization, this may, for example, already be in the initial charge besides the, if appropriate, functionalizing metal oxide particles, or can be added following the dropwise addition of the precursor of the amorphous layer. For example, for the coating of metal oxide particles with an $SiO_2$-containing layer, preferably water, acids or bases are added as catalysts. These can be added to the reaction mixture before adding the precursor or after adding the precursor.

The particles FM can either be functionalized first and then coated, or coated first and then functionalized. Simultaneous functionalization and coating is likewise possible. Preferably, the particles FM are firstly functionalized and then coated. Here, agglomerates of the particles FM are broken up and the average particle size, measured by means of DLS, is lowered to a value of less than 80 nm (% by volume). Such agglomerate-free particles FM are particularly highly suitable for further coating with an amorphous layer. Even after coating the particles FM with an amorphous layer, the average particle size, measured by means of DLS, should remain less than 80 nm (% by volume).

Before coating the functionalized particles FM, by-products can be removed, e.g. by distillation, filtration (e.g. by nanofiltration, ultrafiltration or microcross filtration), centrifugation or decantation. In this connection, it is also possible to exchange the solvents used for the functionalization and/or coating for other solvents, e.g. by nanofiltration, ultrafiltration or microcross filtration, extraction, distillation and redispersion.

If water has been used during the functionalization or coating, it may be necessary to remove these water residues prior to use. The removal of water residues can take place by any known method, e.g. by distillation (at standard or reduced pressure), drying by means of molecular sieve or by chemical drying by means of the addition of chemical compounds which react with water.

Preferred polymerizable compounds PP are polyesterols, polyetherols, polyetheramines and epoxide compounds. In one particularly preferred embodiment, the polymerizable compound PP is an isocyanate-reactive compound, in particular a polyol customary in polyurethane chemistry, polyetherpolyol, an oligo- or polyetheramine, or a polyesterpolyol. In one preferred embodiment, these polyols are diols. Particularly preferred examples of polymerizable compounds PP are:

I) Polyetherpolyols

Polyetherpolyols based on ethylene oxide and/or propylene oxide and/or butylene oxide with a functionality of from 2 to 8, preferably 2 to 3, and molecular weights of from 100 to 10 000, preferably from 300 to 6000, furthermore polyetherpolyols based on tetrahydrofuran with molecular weights of 250-5000. Furthermore, polyetherpolyol based on fatty acid esters such as castor oil or soybean oil.

The polyetherpolyols can be used individually or in the form of mixtures.

II) Polyesterpolyols

Polyesterpolyols with a functionality of 2 to 3 and molecular weights of from 500 to 5000

For example, polyesterpolyols based on dicarboxylic acid compounds and diol compounds are suitable here.

Dicarboxylic acid compounds which can be used here are in principle all $C_2$-$C_{40}$-aliphatic, $C_3$-$C_{20}$-cycloaliphatic, aromatic or heteroaromatic compounds which have two carboxylic acid groups or derivatives thereof. The derivatives used are in particular $C_1$-$C_{10}$-alkyl, preferably methyl, ethyl, n-propyl or isopropyl mono acids or diesters of the aforementioned dicarboxylic acids, the corresponding dicarboxylic acid halides, in particular the dicarbonyl dichlorides and also the corresponding dicarboxylic acid anhydrides. Examples of such compounds are ethanedioic acid (oxalic acid), propanedioic acid (malonic acid), butanedioic acid (succinic acid), pentanedioic acid (glutaric acid), hexanedioic acid (adipic acid), heptanedioic acid (pimelic acid), octanedioic acid (suberic acid), nonanedioic acid (azeleic acid), decanedioic acid (sebacic acid), undecanedioic acid, dodecanedioic acid, tridecanedioic acid (brassylic acid), $C_{32}$ dimer fatty acid (commercial product from Cognis Corp., USA), benzene-1,2-dicarboxylic acid (phthalic acid), benzene-1,3-dicarboxylic acid (isophthalic acid) or benzene-1,4-dicarboxylic acid (terephthalic acid), methyl esters thereof, for example dimethyl ethanedioate, dimethyl propanoate, dimethyl butanedioate, dimethyl pentanedioate, dimethyl hexanedioate, dimethyl heptanedioate, dimethyl octanedioate, dimethyl nonanedioate, dimethyl decanedioate, dimethyl undecanedioate, dimethyl dodecanedioate, dimethyl tridecanedioate, $C_{32}$ dimer fatty acid dimethyl ester, dimethyl phthalate, dimethyl isophthalate or dimethyl terephthalate, dichlorides thereof, for example ethanoyl dichloride, propanedioyl dichloride, butanedioyl dichloride, pentanedioyl dichloride, hexanedioyl dichloride, heptanedioyl dichloride, octanedioyl dichloride, nonanedioyl dichloride, decanedioyl dichloride, undecanedioyl dichloride, dodecanedioyl dichloride, tridecanedioyl dichloride, $C_{32}$ dimer fatty acid dichloride, phthaloyl dichloride, isophthaloyl dichloride or terephthaloyl dichloride and also anhydrides thereof, for example butanedicarboxylic anhydride, pentanedicarboxylic anhydride or phthalic anhydride. Mixtures of the aforementioned dicarboxylic acid compounds can of course also be used.

The diol compounds which can be used here are in principle all $C_2$-$C_{18}$-aliphatic, $C_5$-$C_{20}$-cycloaliphatic, aromatic or heteroaromatic compounds which have two alcohol groups or derivatives thereof (for example diol ethers or diol esters). Examples of suitable alkanediols are ethylene glycol, 1,2-propanediol, 1,3-propanediol, 1,2-butanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 2,4-dimethyl-2-ethyl-1,3-hexanediol, 2,2-dimethyl-1,3-propanediol (neopentyl glycol), 2-ethyl-2-butyl-1,3-propanediol, 2-ethyl-2-isobutyl-1,3-propanediol or 2,2,4-trimethyl-1,6-hexanediol. Of particular suitability are ethylene glycol, 1,3-propanediol, 1,4-butanediol and 2,2-dimethyl-1,3-propanediol, 1,6-hexanediol or 1,12-dodecanediol. Examples of cycloalkanediols are 1,2-cyclopentanediol, 1,3-cyclopentanediol, 1,2-cyclohexanediol, 1,3-cyclohexanediol, 1,4-cyclohexanediol, 1,2-cyclohexanedimethanol (1,2-dimethylolcyclohexane), 1,3-cyclohexanedimethanol (1,3-dimethylolcyclohexane), 1,4-cyclohexanedimethanol (1,4-dimethylolcyclohexane) or 2,2,4,4-tetramethyl-1,3-cyclobutanediol. Examples of suitable aromatic diols are 1,4-dihydroxybenzene, 1,3-dihydroxybenzene, 1,2-dihydroxybenzene, bisphenol A (2,2-bis(4-hydroxyphenyl)propane), 1,3-dihydroxynaphthalene, 1,5-dihydroxynaphthalene or 1,7-dihydroxynaphthalene.

Moreover, polyesterpolyols can also be prepared from alpha-, omega-hydroxycarboxylic acids or their cyclic esters such as, for example, lactides or lactones. The specified hydroxycarboxylic acids include preferably aromatic, aliphatic and heterocyclic compounds, including the corresponding lactones. Preference is given, for example, to 2,2-dimethyl-3-hydroxypropionic acid and its cyclic lactone (pivalolactone), omega-hydroxycaproic acid, omega-hydroxypalmitic acid, butyrolactone, 4-hydroxybutyric acid, 4-(β-hydroxyethyl)benzoic acid, 2-(β-hydroxyethoxy)benzoic acid, 4-hydroxymethylbenzoic acid, 4-hydroxymethylcyclohexanecarboxylic acid, 4-(β-hydroxyethoxy)cyclohexanecarboxylic acid.

Further preferred hydroxycarboxylic acids are, for example, lactic acid, glycolic acid and also cyclic esters such as lactides and caprolactone.

The polyesterpolyols can be used individually or in the form of mixtures.

III) Polyetheramines

Polyetheramines with a functionality of from 2 to 3 and molecular weights of from 500 to 10 000

Suitable polyetheramines comprise, for example, di- or triaminopolyalkylene oxide compounds. These are to be understood as meaning that these compounds comprise, on the one hand, two or three amino functions (NH and/or $NH_2$ functions), and on the other hand, alkylene oxide building blocks. The latter building blocks are in particular ethylene oxide and/or propylene oxide and/or butylene oxide.

The polyetheramines can be used individually or in the form of mixtures.

IV) Epoxide Compounds

Aliphatic, alicyclic, aromatic or heterocyclic monomeric or oligomeric epoxide compounds. Preference is given here to using epoxide compounds with at least 2 polymerizable epoxide groups per molecule.

Particularly preferred epoxide compounds are polyphenol glycidyl ethers, e.g. glycidyl ethers of resorcinol, hydroquinone, bis(4-hydroxyphenyl)methane, bis(4-hydroxy-3-methylphenyl)methane, bis(4-hydroxy-3,5-dibromophenyl)methane, bis(4-hydroxy-3,5-difluorophenyl)methane, 1,1-bis(4-hydroxyphenyl)ethane, 2,2-bis(4-hydroxyphenyl)propane, 2,2-bis(4-hydroxy-3-methylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dichlorophenyl)propane, bis(4-hydroxyphenyl)phenylmethane, bis(4-hydroxyphenyl)diphenylmethane, bis(4-hydroxyphenyl)-4'-methylphenylmethane, 1,1-bis(4-hydroxyphenyl)-2,2,2-trichloroethane, bis(4-hydroxyphenyl)(4-chlorophenyl)-methane, 1,1-bis(4-hydroxyphenyl)cyclohexane, bis(4-hydroxyphenyl)cyclohexylmethane, 4,4'-dihydroxydiphenyl, 2,2'-dihydroxydiphenyl, 4,4'-dihydroxydiphenylsulfone. Particular preference is given to glycidyl ethers of bisphenol A (2,2-bis(4-hydroxyphenyl)propane) or bisphenol F (bis(4-hydroxyphenyl)methane). Epoxy resins of this type have a preferred epoxide equivalent of 160-500.

The epoxide compounds can be used individually or in the form of mixtures.

V) Polyols

Diols and/or triols with molecular weights of less than 600, preferably less than 400. Of suitability are, for example, aliphatic, cycloaliphatic, and/or aralipathic diols having 2 to 20, preferably 4 to 14, carbon atoms, such as, for example, ethylene glycol, 1,3-propanediol, 1,4-butanediol, 1,6-hexanediol, 1,10-dodecanediol, o-, m-, p-dihydroxycyclohexane, diethylene glycol, dipropylene glycol, bis(2-hydroxyethyl)hydroquinone. Examples of triols are 1,2,4- and 1,3,5-trihydroxycyclohexane, triethanolamine, diethanolamine, glycerol. In a further embodiment, reaction products of these polyols with propylene oxide and/or ethylene oxide are used, where preferably 1 to 5 mol of propylene and/or ethylene oxide are used per mole of polyol.

VI) Diamines

Suitable diamine compounds are all organic diamine compounds which have two primary or secondary amino groups, with primary amino groups being preferred. In this connection, the organic basic framework having the two amino groups can have a $C_2$-$C_{20}$-aliphatic, $C_3$-$C_{20}$-cycloaliphatic, aromatic or heteroaromatic structure. Examples of compounds having two primary amino groups are 1,2-diaminoethane, 1,3-diaminopropane, 1,2-diaminopropane, 2-methyl-1,3-diaminopropane, 2,2-dimethyl-1,3-diaminopropane (neopentyldiamine), 1,4-diaminobutane, 1,2-diaminobutane, 1,3-diaminobutane, 1-methyl-1,4-diaminobutane, 2-methyl-1,4-diaminobutane, 2,2-dimethyl-1,4-diaminobutane, 2,3-dimethyl-1,4-diaminobutane, 1,5-diaminopentane, 1,2-diaminopentane, 1,3-dianninopentane, 1,4-diaminopentane, 2-methyl-1,5-diaminopentane, 3-methyl-1,5-diaminopentane, 2,2-dimethyl-1,5-diaminopentane, 2,3-dimethyl-1,5-diaminopentane, 2,4-dimethyl-1,5-diaminopentane, 1,6-diaminohexane, 1,2-diaminohexane, 1,3-diaminohexane, 1,4-diaminohexane, 1,5-diaminohexane, 2-methyl-1,5-diaminohexane, 3-methyl-1,5-diaminohexane, 2,2-dimethyl-1,5-diaminohexane, 2,3-dimethyl-1,5-diaminohexane, 3,3-dimethyl-1,5-diaminohexane, N,N'-dimethyl-1,6-diaminohexane, 1,7-diaminoheptane, 1,8-diaminooctane, 1,9-diaminononane, 1,10-diaminodecane, 1,11-diaminoundecane, 1,12-diaminododecane, 1,2-diaminocyclohexane, 1,3-diaminocyclohexane, 1,4-diaminocyclohexane, 3,3'-diaminodicyclohexylmethane, 4,4'-diaminodicyclohexylmethane (dicyan), 3,3'-dimethyl-4,4'-diaminodicyclohexylmethane (Laromin®), isophoronediamine (3-aminomethyl-3,5,5,5-trimethylcyclohexylamine), 1,4-diazine (piperazine), 1,2-diaminobenzene, 1,3-diaminobenzene, 1,4-diaminobenzene, m-xylylenediamine [1,3-(diaminomethyl)benzene] and p-xylylenediamine [1,4-(diaminomethyl)benzene], diethyltoluenediamine, isophoronediamine. Mixtures of the aforementioned compounds can of course also be used.

Preference is given to using 1,6-diaminohexane, 1,12-diaminododecane, 2,2-dimethyl-1,3-diaminopropane, 1,4-diaminocyclohexane, isophoronediamine, 3,3'-diaminodicyclohexylmethane, 4,4'-diaminodicyclohexylmethane, 3,3'-dimethyl-4,4'-diaminodicyclohexylmethane, m-xylylenediamine or p-xylylenediamine as optional diamine compounds.

VII) Amino-Alcohol Compounds

Amino-alcohol compounds which can be used are in principle all, but preferably $C_2$-$C_{12}$-aliphatic, $C_5$-$C_{10}$-cycloaliphatic or aromatic organic compounds which only have one hydroxy group and one secondary or primary, but preferably one primary, amino group. By way of example, mention may be made of 2-aminoethanol, 3-aminopropanol, 4-aminobutanol, 5-aminopentanol, 6-aminohexanol, 2-aminocyclopentanol, 3-aminocyclopentanol, 2-aminocyclohexanol, 3-aminocyclohexanol, 4-aminocyclohexanol and 4-aminomethylcyclohexanemethanol (1-methylol-4-aminomethylcyclohexane). It is of course also possible to use mixtures of the aforementioned amino-alcohol compounds.

VIII) Aminocarboxylic Acid Compounds

Suitable aminocarboxylic acid compounds are all organic compounds which have one amino and one carboxy group in free or derivatized form, but in particular the $C_2$-$C_{30}$-aminocarboxylic acids, the $C_1$-$C_5$-alkyl esters of the aforementioned aminocarboxylic acids, the corresponding $C_3$-$C_{15}$-lactam compounds, the $C_2$-$C_{30}$-aminocarboxamides or or the $C_2$-$C_{30}$-aminocarbonitriles. Examples of the free $C_2$-$C_{30}$-aminocarboxylic acids which may be mentioned are the naturally occurring aminocarboxylic acids, such as valine, leucine, isoleucine, threonine, methionine, phenylalanine, tryptophan, lysine, alanine, arginine, aspartic acid, cystein, glutamic acid, glycine, histidine, proline, serine, tryosine, asparagine or glutamine and also 3-aminopropionic acid, 4-aminobutyric acid, 5-aminovaleric acid, 6-aminocaproic acid, 7-aminoenanthic acid, 8-aminocaprylic acid, 9-aminopelargonic acid, 10-aminocapric acid, 11-aminoundecanoic acid, 12-aminolauric acid, 13-aminotridecanoic acid, 14-aminotetradecanoic acid or 15-aminopentadecanoic acid. Examples of the $C_1$-$C_5$-alkyl esters of the aforementioned aminocarboxylic acids which may be mentioned are the methyl and ethyl esters of 3-aminopropionic acid, 4-aminobutyric acid, 5-aminovaleric acid, 6-aminocaproic acid, 7-aminoenanthic acid, 8-aminocaprylic acid, 9-aminopelargonic acid, 10-aminocapric acid, 11-aminoundecanoic acid, 12-aminolauric acid, 13-aminotridecanoic acid, 14-aminotetradecanoic acid or 15-aminopentadecanoic acid. Examples of the $C_3$-$C_{15}$-lactam compounds which may be mentioned are β-propiolactam, γ-butyrolactam, δ-valerolactam, ε-caprolactam, 7-enantholactam, 8-caprylolactam, 9-pelargolactam, 10-caprinolactam, 11-undecanolactam, ω-laurolactam, 13-tridecanolactam, 14-tetradecanolactam or 15-pentadecanolactam. Examples of the aminocarboxamides which may be mentioned are 3-aminopropionamide, 4-aminobutyramide, 5-aminovaleramide, 6-aminocapronamide, 7-aminoenanamide, 8-aminocaprylamide, 9-aminopelargonamide, 10-aminocaprinamide, 11-aminoundecanamide, 12-aminolauramide, 13-aminotridecanamide, 14-aminotetradecanamide or 15-aminopentadecanamide, and examples of the aminocarbonitriles which may be mentioned are 3-aminopropionitrile, 4-aminobutyronitrile, 5-aminovaleronitrile, 6-aminocapronitrile, 7-aminoenanthonitrile, 8-aminocaprylonitrile, 9-aminopelargonitrile, 10-aminocaprinonitrile, 11-aminoundecanonitrile, 12-aminolauronitrile, 13-aminotridecanonitrile, 14-aminotetradecanonitrile or 15-aminopentadecanonitrile. However, preference is given to the $C_3$-$C_{15}$-lactam compounds and among these in particular to ε-caprolactam and to ω-laurolactam. Particular preference is given to ε-caprolactam. It is of course also possible to use mixtures of the aforementioned aminocarboxylic acid compounds.

In a further preferred form, the polymerizable compounds PP have a melting point at temperatures of less than 100° C., particularly preferred polymerizable compounds PP are liquid at room temperature.

In one preferred embodiment, the solvent S is water; an alcohol, in particular 2-propanol, ethanol, methanol, benzyl alcohol; an amide, in particular dimethylformamide, N-methyl-2-pyrrolidone; a ketone, e.g. cyclohexanone, acetone, methyl ethyl ketone; an ether, e.g. tetrahydrofuran, dioxane; an ester, e.g. ethyl acetate, butyl acetate, propylene glycol methyl ether acetate, an alkane halide, e.g. dichloromethane, chloroform.

The solvent S may also be a mixture of solvents and is notable for the fact that the component PP is either soluble therein or is miscible therewith out phase separation and the particles FM with an amorphous coating form dispersions that are stable therein and have an average particle size in the nano range, preferably in the range from 10 nm to 80 nm, in particular 10 nm to 50 nm, determined by means of DLS.

In one preferred embodiment, the solvent S has a lower boiling point than the polymerizable compounds PP.

In one preferred embodiment, the dispersion comprises, based on the sum of FM, PP and S:
- 0.1 to 80 parts by weight of functionalized particles FM with an amorphous coating
- 40 parts by weight of PP and
- 0 to 1000 preferably 0 to 99 parts by weight of S.

In one preferred embodiment, the particles FM with an amorphous coating form, following the partial or complete removal of the solvent S, a stable dispersion with an average particle size in the nano range, preferably in the range from 10 nm to 80 nm, in particular 10 nm to 50 nm, determined by means of DLS.

In one preferred embodiment, the dispersion according to the invention additionally comprises further effect substances, in particular additives customary per se in polymers, e.g. in the form of further particles (e.g. $SiO_2$, $ZrO_2$) and/or soluble molecules (e.g. UV absorbers, stabilizers, flame retardants, antioxidants, antifogging agents, glidants, antiblocking agents, organic dyes, IR dyes, fluorescent dyes, lighteners, antistatic agents, biocides, nucleating agents, herbicides, fungicides or pesticides, free-radical scavengers).

The invention further relates to functionalized UV-absorbing inorganic particles FM, preferably of a zinc oxide, titanium oxide or cerium oxide or a mixture thereof, which have an average particle size, measured according to the dynamic light scattering (DLS) method, in the nano range, preferably in the range from 10 nm to 80 nm, in particular 10 nm to 50 nm, wherein the particles are functionalized with a compound F of the formula

$$R^1LF^1$$

in which
$R^1$ is an oxygen-containing radical, in particular alkoxy; aryloxy; ether-group-containing oligomer or polymer
L is a divalent binding group, in particular alkylene having preferably 1 to 10 carbon atoms, in particular methylene, ethylene or propylene
$F^1$ is a metal-oxide-affine group, in particular silanes, amines, carboxylic acids, carboxylates, phosphonic acid, phosphonates, phosphates or sulfonates, in particular $NH_2$, NH, COON, $[COO]^-$, $PO_3H_2$, $[PO_3H]^-$, $[PO_3]^{2-}$, $[PO_4H]^{2-}$, $[PO_4H_2]^-$, $[SO_3]^-$, $CO-CH_2-CO$, especially a trialkoxysilane radical of the formula $-Si(OR)_3$, in which R is an alkyl radical,
and in which the particles FM have an amorphous coating, preferably of oxides and/or oxide hydroxides and/or oxide hydrates of silicon, aluminum or zirconium, in particular an $SiO_2$-containing layer.

The invention further relates to a method for producing amorphously coated, functionalized particles which comprises
i) bringing inorganic particles in a solvent into contact with a functionalizing compound, preferably compounds F of the formula $R^1LF^1$, where $R^1$, L and $F^1$ have the meaning given above
ii) coating the resulting functionalized particles with precursors of an amorphous coating, in particular of a tetraalkoxysilane, polysiloxane, silicic acid or alkali metal silicate to form a closed amorphous coating and
iii) if appropriate removing solvents and further auxiliaries.

The invention further relates to functionalized UV-absorbing inorganic particles FM obtainable according to the method according to the invention.

The invention further relates to a method for producing a dispersion according to the invention, which comprises a) providing a dispersion comprising functionalized UV-absorbing inorganic particles FM, preferably UV-absorbing metal oxide particles, in particular zinc oxide particles with an amorphous coating, preferably with a coating based on oxides, oxide hydroxides and/or oxide hydrates of silicon, aluminum or zirconium, in particular with an $SiO_2$-containing coating having an average particle size in the nano range, preferably in the range from 10 nm to 80 nm, in particular 10 nm to 50 nm, determined by means of DLS, in a solvent S, preferably by dispersing the functionalized metal oxide particles in a continuous phase, preferably THF, benzyl alcohol, dimethylformamide, methyl ethyl ketone, cyclohexanone, N-methyl-2-pyrrolidone, and preferably using customary dispersing devices such as, for example, magnetic or mechanical stirrers,
b) adding the component PP or a solution of the component PP in the solvent S
c) if appropriate completely or partially removing the solvent S.

The dispersions according to the invention are suitable for producing a filled polymeric material. The material can be, for example, a polyurethane, polyurea, epoxy resin, polyester, polyester resin or a blend thereof.

The dispersions and functionalized particles according to the invention are exceptionally suitable for stabilizing polymers, in particular against UV radiation. Within the context of this invention, polymers are understood as meaning high molecular weight compounds, including, for example, polyaddition compounds, in particular polyurethanes. The polyurethanes may either be solid, nonfoamed polyurethanes, for example thermoplastic polyurethanes, e.g. transparent TPU types for film applications, as well as PU elastomers. Furthermore, they may also be polyurethane foams, e.g. for shoe systems. If they are foams, water or physical foaming agents are additionally added, for example pentane. A particular embodiment is polyurea which is used, for example, in coating applications.

The invention also relates to a method for producing a stabilized polymer which comprises introducing a dispersion according to the invention into a polymer, a prepolymer or into the starting components for producing a polymer. In this process, the dispersion according to the invention can, for example, be used together with a polyol for forming a polyurethane.

EXAMPLES

Dynamic Light Scattering (DLS)

The measurements are carried out using a Zetasizer Nano S instrument from Malvern Instruments at room temperature. The average particle size is determined according to the volume fraction.

Transmission Electronmicroscopy (TEM)

The TEM investigations were carried out on a Tecnai G2 instrument from FEI with an integrated Energy Dispersive X-Ray Spectroscopy (EDXS) system. The samples were prepared on C-film (Lacey Carbon Film). The elemental analysis by means of EXDS was carried out at those sites where the film had a hole.

UV-VIS Transmission Spectroscopy

The total diffuse transmission by the product was carried out in a 0.1 mm quartz glass cuvette using a Perkin Elmer Lambda 900 spectral photometer with a 150 mm integrating sphere (Ulbricht sphere). The reference used was Spektralon white standard from Labsphere.

Example 1

Preparation of ZnO 73.6 g of zinc acetate dihydrate were suspended in a 421 flask in 2236 ml of 2-propanol and heated to 75° C. In parallel to this, 32.8 g of potassium hydroxide were dissolved in 1168 ml of 2-propanol at 75° C. The KOH solution was then added to the zinc acetate suspension with vigorous stirring, the resulting mixture was heated at 75° C. for 1 hour with stirring and cooled to room temperature. The resulting white precipitate was deposited, the supernatant was filtered off with suction, the white residue was washed with 1000 ml of 2-propanol and deposited. The supernatant was again filtered off with suction, the white residue was again washed with 2-propanol and deposited. After refiltering the liquid supernatant with suction, the white residue was topped up with 2-propanol.

Example 2

Functionalization according to the invention of ZnO with 2-[methoxy(polyethyleneoxy)-propyl]trimethoxysilane and subsequent coating with an $SiO_2$-containing layer by hydrolysis of tetramethoxysilane Analogously to example 1, 1348 g of a 4.45% by weight dispersion of an unfunctionalized ZnO in 2-propanol were prepared. A solution of 15 g of 2-[methoxy(polyethyleneoxy) propyl]trimethoxysilane in 631 g of 2-propanol was then added dropwise to this solution over the course of 190 minutes with vigorous stirring. The suspension was heated to 60° C. and the mixture was heated under reflux for 30 minutes. 81 g of a 25% strength by weight aqueous $NH_3$ solution were then added and the resulting suspension was heated at 60° C. for 12 hours with stirring. The suspension became transparent during this. Furthermore, a solution of 7.5 g of tetramethoxysilane (TMOS) in 118 g of 2-propanol was added to the resulting suspension over the course of 40 minutes with stirring. The resulting suspension was stirred for 16 hours at 60° C. 2-Propanol and $NH_3$ were then removed at 50° C. in a rotary evaporator until the pressure had a constant value of <10 mbar. The white residue of coated and functionalized particles FM was then dried in vacuo <10 mbar for a further 60 minutes (resulting N/Zn ratio<0.2% by weight).

Example 3

Dispersion comprising 2-[methoxy(polyethyleneoxy) propyl]trimethoxysilane-functionalized then $SiO_2$-coated ZnO in a polyesterpolyol The white residue of functionalized and coated particles FM obtained according to example 2 was redispersed in THF to form a 5% strength by weight ZnO dispersion. The average particle size determined by means of DLS was 25 nm (% by volume). TEM analysis confirmed the amorphous Si-containing coating around ZnO particles. In total, ca. 1150 g of a 5% by weight ZnO dispersion in THF were prepared.

Furthermore, a solution comprising 1000 g of a difunctional polyesterpolyol and 1000 g of THF was prepared. The polyesterpolyol had a molecular weight of 2000 and was prepared from adipic acid and equimolar amounts of 1,4-butanediol and ethylene glycol. 1150 g of the aforementioned redispersed ZnO dispersion in THF were added to this solution. The resulting mixture remained transparent.

The composition obtained corresponds to ca. 2.3 parts by weight of ZnO (or ca. 3 parts by weight of functionalized and $SiO_2$-coated ZnO), 40 parts by weight of polyesterpolyol and 83 parts by weight of THF.

THF was then removed on a rotary evaporator in vacuo at 50° C. so that a constant pressure of less than 10 mbar was reached. This gave a 5.35% strength by weight ZnO dispersion in the polyesterpolyol. After stripping off THF, no phase separation or clouding was observed. The average particle size (% by volume) determined by means of DLS was 28 nm. Using UV-vis spectroscopy, an absorption edge at ca. 370 nm was detected.

Example 4

Reaction of a 5.35% by weight 2-[methoxy(polyethyleneoxy)propyl]trimethoxysilane-functionalized and $SiO_2$-coated ZnO dispersion in the polyesterpolyol to give a ZnO-filled polyurethane 700 g of the ZnO-filled polyesterol from example 3 and 157.21 g of 1,4-butanediol were weighed into a reaction vessel and heated to 80° C. Antioxidants known per se were then added (0.1% by weight of Irganox® 1098, 0.1% by weight of Irganox® 1010 and 0.15% by weight of Chisorb 622). Following subsequent heating of the solution to 80° C., 527.51 g of 4,4'-MDI (methylenediphenyl diisocyanate) were added and stirring was continued until the solution was homogeneous. The reaction mass was then poured into a flat dish and heat-treated at 125° C. on a hot-plate for 10 min. The slab which formed was then heat-treated at 80° C. in a heating cabinet for 15 h. Following granulation of the pour plates, these were processed in an injection molding machine to give 2 mm injection-molded sheets. The product had a Shore hardness of Shore 57D and abrasion of 110 $mm^3$. The injection-molded sheet was translucent and exhibited almost no shrinkage. Compared to the sample from example 4, the sample from example 7 comprising ZnO particles with an amorphous coating had improved UV stability.

Example 5

Dispersion comprising 2-[methoxy(polyethyleneoxy) propyl]trimethoxysilane-functionalized then $SiO_2$-coated ZnO in diglycidyl ether of bisphenol A (DGEBA A)

The particles FM obtained according to example 2 were redispersed in methyl ethyl ketone (MEK) to form a 12% strength by weight ZnO dispersion. A transparent suspension was formed. In total, ca. 1100 g of a 12% by weight ZnO-dispersion in MEK were prepared. The MEK consumption was ca. 930 g.

A solution comprising 500 g of the diglycidyl ether of bisphenol A (DGEBA) and 1000 g of MEK was prepared. Then, with stirring, 1100 g of the ZnO dispersion in MEK were then added to this solution. 1100 g of a 2-[methoxy (polyethyleneoxy)propyl]-trimethoxysilane-functionalized and $SiO_2$-coated 12% by weight ZnO dispersion in MEK were then added to this solution with stirring. The resulting mixture remained transparent.

The composition corresponds to ca. 10.6 parts by weight of ZnO (or ca. 13.8 parts by weight of functionalized and $SiO_2$-coated ZnO), 40 parts by weight of DGEBA A and 154 parts by weight of THF.

THF was then removed on a rotary evaporator in vacuo at 50° C. so that the vacuum pressure reached a constant value of less than 10 mbar. This gave a ca. 19.7% by weight ZnO dispersion in DGEBA A. After and/or during the stripping off of MEK, no phase separation and/or clouding was observed. The average particle size (% by volume) determined by means of DLS was ca. 15 nm.

Example 6

Preparation of oligoether silane $CH_3O[CH_2CH(CH_3)O]_{10}(CH_2CH_2O)_5(CH_2)_3Si(OEt)_3$ a) Preparation of the allyl alkoxylate $HO[CH_2CH(CH_3)O]_{10}(CH_2CH_2O)_5CH_2CHCH_2$ A mixture of allyl alcohol (133.6 g, 2.3 mol) and potassium tert-butylate (7.90 g) was initially introduced into a 5 l pressurized autoclave and heated to 25° C.

The system was then rendered inert three times with nitrogen to 5 bar and the temperature was increased to 130° C. Subsequently, ethylene oxide (506 g, 11.5 mol) was metered in and, when addition was complete, the mixture was afterstirred for 2 h. Propylene oxide (1334 g, 23 mol) was then likewise metered in at 130° C. and also afterstirred overnight. This gave 1954 g of allyl alcohol-5 EO-10 PO(OH number 63.6 mg KOH/g, theory 65.4 mg KOH/g).

b) Preparation of the allyl alkoxylate methyl ether $CH_3O[CH_2CH(CH_3)O]_{10}(CH_2CH_2O)_5CH_2CHCH_2$ In a stirred apparatus, allyl alcohol-5 EO-10 PO (459 g, 0.520 mol) was initially introduced and admixed dropwise with 50% strength aqueous NaOH solution (238 g, 2.98 mol) at 34-36° C. Dimethyl sulfate (87.1 ml, 0.920 mol) was then metered in over the course of 1 h at 36° C. The reaction mixture was stirred overnight at 40° C. and, following the subsequent addition of water (520 g), stirred for 1 h at 95° C. The two phases were separated in a separating funnel and the organic phase was freed from the residual water on a rotary evaporator. The compound was then admixed with Ambosol (3 percent by weight), filtered and stabilized with 0.025 percent by weight of aqueous 33% strength sodium benzoate solution. This gave 426 g of product.

c) Hydrosilylation

The allyl alkoxylate methyl ether (201 g, 0.230 mol) was initially introduced and the stirred apparatus was flooded with argon. Triethoxysilane (43.2 ml, 0.230 mol) was then injected in via a septum and the reaction mixture was heated to 80-90° C. Hexachloroplatinic acid (0.175 ml, 7.5% strength solution in isopropanol) was then carefully added via a syringe and, when addition was complete, the mixture was afterstirred for a further 15 min. This gave 225 g of $CH_3O[CH_2CH(CH_3)O]_{10}(CH_2CH_2O)_5(CH_2)_3Si(OEt)_3$ with a degree of silanization of 80% ($^1$H-NMR).

Example 7

Functionalization According to the Invention of ZnO and Subsequent Coating 1200 g of a 2% by weight dispersion of an unfunctionalized ZnO in 2-propanol were prepared analogously to example 1. A solution of 13 g of ammonia solution (25% strength in water) was added to said solution at room temperature. A solution of 16 g of $CH_3O[CH_2CH(CH_3)O]_{10}(CH_2CH_2O)_5(CH_2)_3Si(OEt)_3$ from example 6 in 63 g of 2-propanol was then added dropwise over the course of 30 minutes with vigorous stirring. The suspension was heated to 60° C. and further stirred for 24 hours at 60° C. The suspension became translucent. The experiment was repeated five times.

Part of the suspension (ca. 5700 g comprising 107 g of ZnO) was initially introduced into a stirred apparatus and heated to 60° C. A solution of 13.6 g of tetramethoxysilane (TMOS) in 209 g of 2-propanol was added to the suspension with stirring at 60° C. over the course of 60 minutes. The suspension obtained was after stirred for 16 hours at 60° C. 2-Propanol was then removed at 50° C. in a rotary evaporator until the pressure had a constant value of <10 mbar. The white residue of coated and functionalized ZnO particles was then dried in vacuo <10 mbar for a further 60 minutes (resulting N/Zn ratio<0.2% by weight).

Example 8

Dispersion in a Polyetheramine

The residue of functionalized and coated ZnO particles obtained according to example 7 was redispersed in THF to give a ca. 6% strength by weight ZnO dispersion. The average particle size determined by means of DLS was 25 nm (% by volume). TEM analysis confirmed an amorphous Si-containing coating around the ZnO particles.

Furthermore, a solution comprising 3165 g of a difunctional polyetheramine with a molecular weight of 2000 (D-2000, BASF) and 1000 g of THF was prepared. Then, ca. 1630 g of the 6% strength by weight ZnO dispersion in THF were added to this solution with stirring. The resulting mixture remained translucent.

The resulting composition corresponds to ca. 1.25 parts by weight of ZnO (or ca. 1.6 parts by weight of functionalized and $SiO_2$-coated ZnO), 40 parts by weight of polyetheramine D-2000 and 31.5 parts by weight of THF.

THF was then removed on a rotary evaporator in vacuo at 50° C. so that the vacuum pressure reached a constant value of less than 10 mbar. This gave a ca. 3% strength by weight ZnO dispersion in the polyetheramine D-2000. After stripping off THF, no phase separation or clouding was observed. The average particle size (% by volume) determined by means of DLS was ca. 24 nm. Using UV-vis spectroscopy, an absorption edge at ca. 370 nm was detected.

Example 9

A prepolymer of diphenylmethane diisocyanate (MDI) with a weight fraction of ca. 50% 2,4'-isomer and ca. 50% 4,4'-isomer (51 parts by weight) and a polyoxypropylene polyetherpolyol with a nominal functionality of two and a OH number of 56 mg KOH/g (49 parts by weight) was prepared. The prepolymer was obtained according to a standard method at a mixing temperature of 80° C. and a reaction time of two hours.

For the isocyanate-reactive component admixed with modified ZnO, the following formulation was used:

| Constituent | Parts by weight |
| --- | --- |
| ZnO dispersion in polyetheramine according to example 8 | 46.63 |
| Polyetheramine D 2000 | 16.98 |

| Constituent | Parts by weight |
| --- | --- |
| Polyetheramine D 400 | 16.82 |
| Ethacure ® 100 | 19.57 | where:

Polyetheramine D 2000: is a commercially available polyoxypropylenediamine from BASF SE with the molecular weight 2000.

Polyetheramine D 400: is a commercially available aliphatic polyoxypropylenediamine terminated with a primary amine, from BASF SE.

Ethacure®100: is an 80/20 mixture of 3,5-diethyl-2,4-toluenediamine and 3,5-diethyl-2,6-toluenediamine.

The isocyanate-reactive formulation was reacted with the isocyanate-containing prepolymer in sprayed polyurea elastomer. Here, a mixing ratio of isocyanate-reactive component to isocyanate component of ca. 100:109 was used, which corresponded to an isocyanate index of ca. 104. A spraying machine from Graco was used, at a component temperature of 65° C. and a processing pressure of from 110 to 120 bar.

The coatings were sprayed on to a steel plate which had been provided beforehand with a release agent. The coatings were detached by carefully pulling them off starting in one corner of the sheet. The coating obtained was exposed to UV light and exhibited improved UV stability compared with a coating which had been prepared in an analogous manner but without ZnO particles according to the invention.

The invention claimed is:

1. A dispersion comprising
    1) a functionalized UV-absorbing metal oxide particle FM which has an average particle size, measured by the dynamic light scattering (DLS) method, in a range from 10 nm to 50 nm, wherein the metal oxide particle FM is functionalized with a compound F of the formula:

$R^1LF^1$ in which
    $R^1$ is an oxygen-containing radical,
    L is a divalent bonding group,
    $F^1$ is a metal-oxide-affine group;
    2) polymerizable compound PP and a solvent S, and optionally
    3) a polymer soluble in the solvent S,
    wherein the functionalized metal oxide particle FM has an amorphous coating; and
    wherein the amorphous coating is selected from the group consisting of oxide; oxide hydroxide; or oxide hydrates of silicon, aluminum or zirconium; and mixtures thereof.

2. The dispersion according to claim 1 wherein the metal oxide particle is a zinc oxide, titanium oxide or cerium oxide.

3. The dispersion according to claim 1 wherein metal oxide particles FM are functionalized with a compound F of the formula:

$R^{23}O—(CH_2CR^{21}R^{22}O)_p(CH_2)_q—F^1$ in which
    $R^{21}$ and $R^{22}$ are identical or different, hydrogen or an alkyl radical, where $R^{21}$ and $R^{22}$, if they appear more than once, can have different meanings and the group indexed with p can occur blockwise or in random distribution
    $R^{23}$ is hydrogen or an alkyl radical,
    p is an integer from 1 to 50,
    q is 0 or an integer from 1 to 10,
    and in which $F^1$ is a metal-oxide-affine group.

4. The dispersion according to claim 1, wherein the functionalized metal oxide particle FM comprises a zinc oxide, titanium oxide or cerium oxide or a mixture thereof and F corresponds to the following formula:

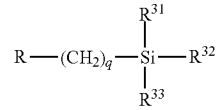

in which
R is $R^{10}O(CH_2CHR^{11}O)_p$,
p is 0 or an integer, where the group indexed with p can be composed of radicals with different meanings for $R^{11}$,
$R^{10}$ is H or $C_1$-$C_4$-alkyl,
$R^{11}$ is H, alkyl having 1 to 4 carbon atoms,
$R^{31}$, $R^{32}$ and $R^{33}$ are identical or different, hydrogen or alkoxy, where at least one of the groups $R^1$, $R^2$, $R^3$ is hydrolysable,
and in which q is 0 or an integer from 1 to 10.

5. The dispersion according to claim 1, wherein the polymerizable compound PP is an isocyanate-reactive compound.

6. A functionalized UV-absorbing inorganic particle FM, which has an average particle size, measured according to the dynamic light scattering (DLS) method, in a range from 10 nm to 50 nm, wherein the particle FM is functionalized with a compound F of the formula $R^1LF^1$ in which
    $R^1$ is an oxygen-containing radical,
    L is a divalent binding group,
    $F^1$ is a metal-oxide-affine group,
    and in which the particle FM has an amorphous coating; and wherein the amorphous coating is selected from the group consisting of oxide; oxide hydroxide; or oxide hydrates of silicon, aluminum or zirconium; and mixtures thereof.

7. A method for producing the functionalized particle according to claim 6, which comprises
    i) bringing inorganic particles in a solvent into contact with a functionalizing compound $F^1$ of the formula

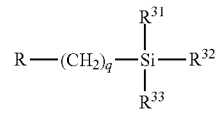

in which
    R is $R^{10}O(CH_2CHR^{11}O)_p$,
    p is 0 or an integer, where the group indexed with p can be composed of radicals with different meanings for $R^{11}$,
    $R^{10}$ is H or $C_1$-$C_4$-alkyl,
    $R^{11}$ is H, alkyl having 1 to 4 carbon atoms,
    $R^{31}$, $R^{32}$ and $R^{33}$ are identical or different, hydrogen or alkoxy, where at least one of the groups $R^1$, $R^2$, $R^3$ is hydrolysable,
    and in which q is 0 or an integer from 1 to 10,
    ii) coating the resulting functionalized particles with precursors of an amorphous coating, wherein the amorphous coating is selected from the group consisting of oxide; oxide hydroxide; or oxide hydrates of silicon, aluminum or zirconium; and mixtures thereof, and optionally
    iii) removing solvents and further auxiliaries.

8. A method for producing the dispersion according to claim 1, which comprises
   a) providing a dispersion comprising functionalized metal oxide particles, with average particle size measured according to the dynamic light scattering (DLS) method in the nano range, and the solvent S,
   b) adding the component PP or a solution of the component PP in the solvent S, and optionally
   c) completely or partially removing the solvent S.

9. A method for producing a filled polymeric material, comprising filling a polymeric material with the dispersion according to claim 1.

10. A method for stabilizing a polymer, comprising adding the dispersion according to claim 1 to the polymer.

11. The method according to claim 10, wherein the dispersion is added together with a polyol for forming a polyurethane.

12. A method for producing a polymer stabilized against UV radiation, which comprises introducing the dispersion according to claim 1, into a polymer, a prepolymer or into the starting components for producing a polymer and mixing them therewith.

13. The dispersion according to claim 1, wherein the polymerizable polymers PP are monomers, oligomers or prepolymers which can be converted into polymers by polymerization.

14. The dispersion according to claim 13, wherein the polymerizable compounds PP can be converted into polymers by non-radical polymerization.

15. The dispersion according to claim 1, wherein,
$R^1$ is alkoxy; aryloxy; ether-group containing oligomer or polymer,
L is alkylene having 1 to 10 carbon atoms, and
$F^1$ is a trialkoxysilane radical.

16. The dispersion according to claim 3 wherein
$R^{21}$ and $R^{22}$ are identical or different and are hydrogen, methyl or ethyl,
$R^{23}$ is H, methyl or ethyl,
p is 0 or an integer from 1 to 35, and
q is 0 or an integer from 1 to 3.

17. The dispersion according to claim 4, wherein
p is an integer from 1 to 100 or 0,
$R^{10}$ is H, methyl or ethyl,
$R^{11}$ is H, methyl or ethyl, and
$R^{31}$, $R^{32}$, and $R^{33}$ are identical or different and are methoxy or ethyloxy.

* * * * *